United States Patent [19]

Doshi et al.

[11] Patent Number: 4,640,813
[45] Date of Patent: Feb. 3, 1987

[54] SOLUBLE BURNABLE ABSORBER ROD FOR A NUCLEAR REACTOR

[75] Inventors: Pratap K. Doshi; John F. Wilson, both of Murrysville Boro, Pa.

[73] Assignee: Westinghouse Electric Corp., Pittsburgh, Pa.

[21] Appl. No.: 654,625

[22] Filed: Sep. 26, 1984

[51] Int. Cl.[4] .......................... G21C 7/04; G21C 7/10
[52] U.S. Cl. ..................................... 376/327; 376/328; 376/447; 376/412; 376/454
[58] Field of Search .............. 376/327, 426, 429, 447, 376/454, 328, 419, 412, 333, 209, 339; 252/181.6

[56] References Cited

U.S. PATENT DOCUMENTS

| | | | |
|---|---|---|---|
| 3,085,954 | 4/1963 | Stohr et al. | 376/426 |
| 3,103,476 | 9/1963 | Mumm . | |
| 3,110,656 | 11/1963 | Mills | 376/328 |
| 3,125,493 | 3/1964 | D'Amore | 376/426 |
| 3,141,830 | 7/1964 | Klepfer . | |
| 3,218,236 | 11/1965 | Tollet | 376/333 |
| 3,261,756 | 7/1966 | Ripley | 376/454 |
| 3,352,757 | 11/1967 | Dee et al. . | |
| 3,510,398 | 5/1970 | Wood . | |
| 3,580,809 | 5/1971 | Williams et al. | 376/412 |
| 3,652,394 | 3/1972 | Braun | 376/327 |
| 3,663,366 | 5/1972 | Sauar . | |
| 3,679,545 | 7/1972 | Leiruik . | |
| 3,773,617 | 11/1973 | Marmonier et al. . | |
| 4,229,256 | 10/1980 | Luetzow . | |
| 4,381,283 | 4/1983 | Walton | 376/327 |
| 4,432,934 | 2/1984 | Gjertsen et al. | 376/333 |
| 4,460,540 | 7/1984 | Funk et al. | 376/447 |

OTHER PUBLICATIONS

Am. Cer. Soc. Bull., vol. 36, No. 3, 3/57, pp. 109–111 Finlay.

Primary Examiner—Harvey E. Behrend

[57] ABSTRACT

A soluble burnable absorber rod for a nuclear reactor fuel assembly has a tubular body with a pair of end plugs sealing the opposite ends thereof and defining a chamber within the body. A neutron absorber material in liquid form, preferably boric acid with an enhanced concentration of boron isotope B-10, is contained within the chamber. The tubular body has reinforcing convolutions formed therein for strengthening the body to withstand external pressure acting thereon. Also, one of the end plugs acts as a hydride sink and a hydrogen getter material is disposed adjacent the other end plug.

8 Claims, 2 Drawing Figures

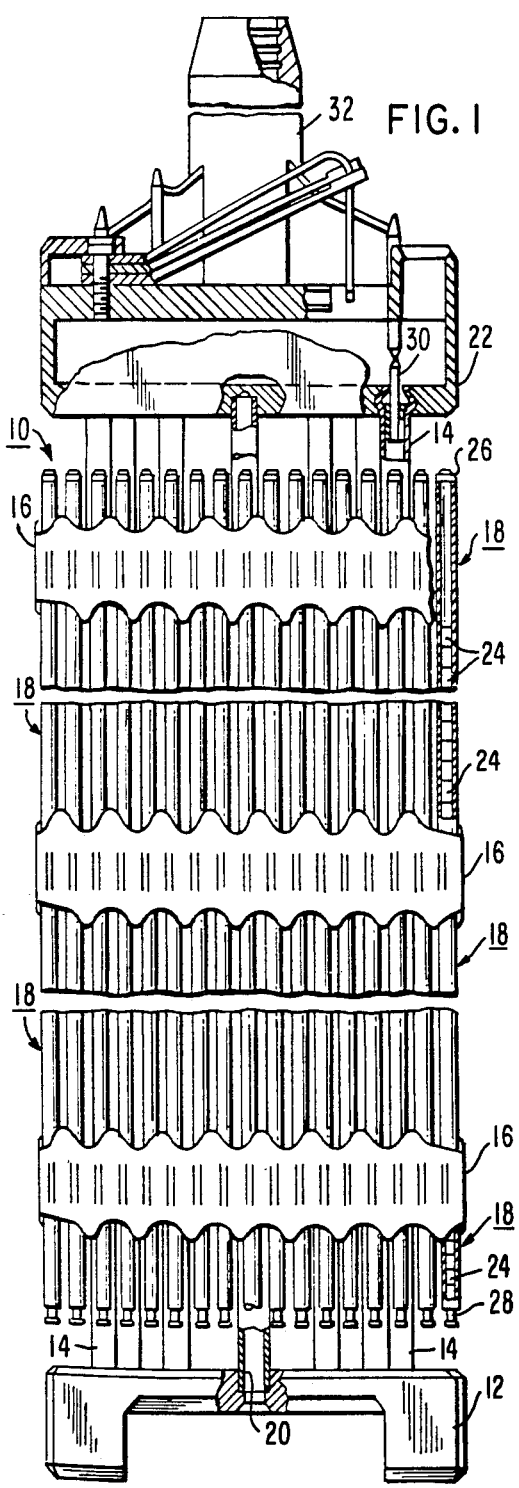
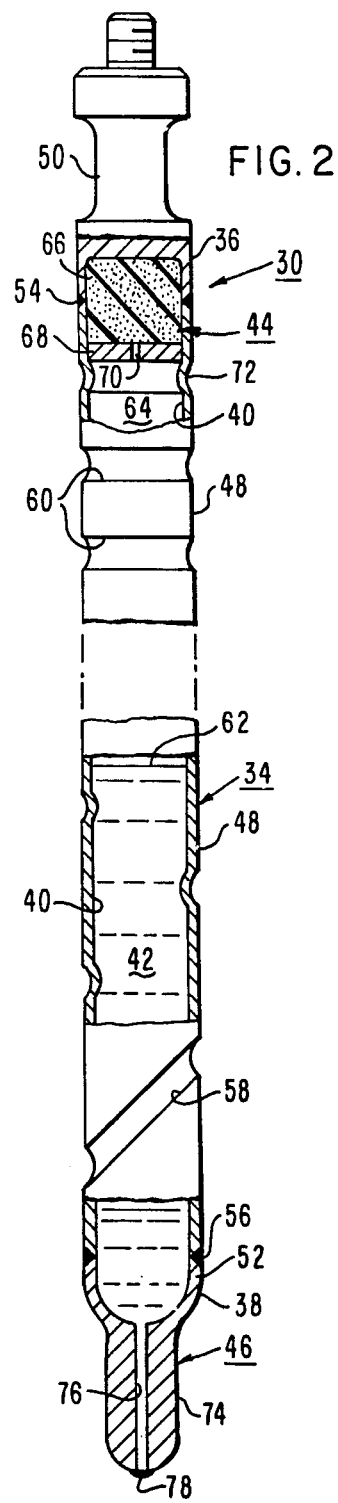
FIG. 1
FIG. 2

SOLUBLE BURNABLE ABSORBER ROD FOR A NUCLEAR REACTOR

CROSS REFERENCE TO RELATED APPLICATION

Reference is hereby made to the following copending U.S. application dealing with related subject matter and assigned to the assignee of the subject application: "Light Water Moderator Filled Rod For A Nuclear Reator"; by P. K. Doshi et al; assigned U.S. Ser. No. 654,709; and filed Sept. 26, 1984.

BACKGROUND OF THE INVENTION

1. Field of the Invention

The present invention relates generally to nuclear reactors and, more particularly, is concerned with a unique design of a soluble burnable absorber rod for use in a nuclear reactor which achieves substantially complete absorber burnup and has reduced fabrication cost.

2. Description of the Prior Art

In a typical nuclear reactor, the reactor core includes a large number of fuel assemblies each of which is composed of top and bottom nozzles with a plurality of elongated transversely spaced guide thimbles extending between the nozzles and a plurality of transverse grids axially spaced along the guide thimbles. Also, each fuel assembly is composed of a plurality of elongated fuel elements or rods transversely spaced apart from one another and from the guide thimbles and supported by the grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and from the guide thimbles.

Also, it is conventional practice to design an excessive amount of neutron flux into the reactor core at start-up so that as the flux is depleted over the life of the core there will still be sufficient reactivity to sustain core operation over a long period of time. In view of this practice, in some reactor applications burnable poison rods are inserted within the guide thimbles of some fuel assemblies to assist the control rods in the guide thimbles of other fuel assemblies in maintaining the neutron flux or reactivity of the reactor core relatively constant over its lifetime. The burnable poison rods, like the control rods, contain neutron absorber material. They differ from the control rods mainly in that they are maintained in stationary positions within the guide thimbles during their period of use in the core.

The overall advantages to be gained in using burnable poison at stationary positions in a nuclear reactor core are described in U.S. Pat. No 3,510,398 to Wood. Heretofore, rods containing burnable poison intended to be stationarily positioned within the reactor core have been of the "fixed" type. By a rod being of the fixed type, it is meant that the absorber content of the burnable poison at any axial elevation on the rod is fixed by the initial loading of the material during manufacture of the rod.

The burnable poison rod in the Wood patent is representative of the fixed type. A major disadvantage of the fixed type absorber rod, such as the one illustrated and described in this patent, is that not all of the poison material in the rod burns up completely or depletes evenly. The shape of the axial depletion curve for the fixed type absorber rod is approximately the same as the axial neutron flux distribution curve averaged over the core life cycle. However, because of the lack of correspondence between the average axial distribution of neutron flux and some of the neutron flux peaks occurring in the reactor core over the life cycle of core operation, poison material at certain axial locations of the fixed type burnable poison rod depletes more rapidly than at other locations. This results in incomplete absorber depletion at the other locations, which means there is a substantial residual absorber penalty at the end of the cycle.

Consequently, a need exists for a burnable poison rod design which will have an improved fuel cycle cost benefit over the previous fixed design, as represented by the rod design in the Wood patent, in terms of fabrication costs and increased length of core cycle.

SUMMARY OF THE INVENTION

The present invention provides a soluble burnable poison or neutron absorber rod designed to satisfy the aforementioned needs. Unlike the prior art rod, the absorber content of the material at any axial location of the rod of the present invention is not fixed at the time of manufacture nor at any time thereafter. Instead, the absorber material can circulate so that axial zones which are depleted faster than the average (due to neutron flux peaks) can be replenished with absorber material from other axial regions of the rod having lower depletion rates. Underlying the present invention is the recognition that by simply providing the absorber material in mobile rather than fixed form, it will be driven into circulation within the rod by thermal gradients which are normally present along the height of the rod. No external driving source is required.

Thus, the absorber content tends to maintain a constant value over the full height of the rod of the invention as it is depleted rather than burning out faster at certain local elevations. Since during the manufacture of the rod the amount of absorber material required is calculated for the peak neutron flux location, the fixed absorber rod type requires more absorber material than the circulating type of the present invention. In contrast to the substantial residual absorber penalty at the end of the core cycle in the case of the fixed absorber type, the circulating type of the invention can be entirely depleted over its full length so there is no significant residual absorber penalty associated with it. In summary, therefore, as compared to the prior fixed type of absorber rod, the circulating absorber rod extends the burnup and thereby results in an increased cycle length. Also, it is felt that its fabrication costs would be less.

Accordingly, the present invention sets forth in a fuel assembly for a nuclear reactor including a plurality of guide thimbles and a plurality of nuclear fuel rods spaced apart from one another and from the guide thimbles and grouped together in an array organized to generate a neutron flux in the fuel assembly, an improved burnable absorber rod for insertion into at least one of the guide thimbles for regulating the reactor neutron flux. The improved burnable absorber rod is composed of: (a) an elongated hollow tubular member having opposite ends and a hermetically sealed chamber defined therein between its ends; (b) a neutron absorber material in liquid form contained in the sealed chamber within the tubular member; (c) means providing a hydride sink disposed at one end of the tubular member and in communication with the sealed chamber; and (d) means providing a hydrogen getter disposed at the other end of the tubular member and in communication with the sealed chamber.

More particularly, the tubular member is formed by a tubular body of thin wall construction and a pair of end plugs attached to the opposite ends of the body so as to hermetically seal the same. The tubular body has one or more reinforcing convolutions formed therein which enhance the structural rigidity and integrity of the rod so as to enable it to better withstand both high internal and external pressures acting thereon. The reinforcing convolutions can take on the shape of a recess or groove formed in the body so as to extend along a spiraling path between the ends of the tubular member. Or, alternatively, the convolutions can be a series of ring-like circular grooves formed in the body so as to extend circumferentially about and be spaced axially along the tubular member between the ends thereof. Still further, some combination of both can be used. The liquid neutron absorber material is preferably composed of boron dissolved in water with the boron enriched with B-10 over the proportion naturally contained therein. Also, since the rod is designed to have absorber material at full core height during operation, the column of liquid absorber material in the rod is reduced during non-operating periods. Thus, there will be some empty vapor space left within the chamber of the tubular member.

Further, more specifically, the material composing the tubular body and end plugs of the tubular member is preferably Zircaloy-4. To reduce corrosion of the inside of the tubular member, the material is beta quenched. This also reduces the hydride pickup in the member due to free hydrogen from the oxidation or burn process. The solid lower end plug provides the means serving as the hydride sink and has an outer end portion of reduced diameter adapting it to fit into a dashpot in the lower end of the guide thimble. The upper end plug of the tubular member is an attachment fitting and disposed adjacent thereto is the means providing the hydrogen getter which takes the form of a Zircaloy sponge adaped to remove hydrogen from the vapor space in the chamber of the tubular member. The sponge is retained at the upper end against the fitting by a disc which has a central opening for allowing passage of the hydrogen gas to the sponge and is held against the sponge by a circumferential bulge formed in the body of the tubular member. Finally, the sealed chamber of the tubular member is prepressurized with helium gas so that at core operating temperature the internal pressure of the chamber will be in equilibrium with the external pressure in the core.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is an elevational view, partly in section, of a fuel assembly which incorporates at least one of the improved soluble burnable absorber rods of the present invention, the assembly being illustrated in vertically foreshortened form with parts broken away for clarity.

FIG. 2 is an enlarged, vertically foreshortened, sectional view of the improved burnable absorber rod of the present invention.

DETAILED DESCRIPTION OF THE INVENTION

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28. The fuel pellets 24 composed of fissile material are responsible for creating the reactive power of the PWR. A liquid moderator/coolant such as water, or water containing boron, is pumped upwardly through the fuel assemblies of the core in order to extract some of the heat generated therein for the production of useful work.

Improved Burnable Absorber Rod

In the operation of a PWR it is desirable to prolong the life of the reactor core as long as feasible to better utilize the uranium fuel and thereby reduce fuel costs. To attain this objective, it is common practice to provide an excess of reactivity initially in the reactor core and, at the same time, provide means to maintain the reactivity relatively constant over its lifetime.

The present invention relates to such means in the form of an improved soluble burnable poison or neutron absorber rod 30, as seen in FIG. 1, inserted into one of the guide thimbles 14. At least one, and preferably several of the rods 30 are stationarily supported by a spider 32 in the guide thimbles 14 of some of the fuel assemblies 10 to assist the movable control rods in the guide thimbles of other fuel assembles (not shown) in maintaining a substantially constant level of neutron flux or reactivity in the core throughout its operating cycle.

Referring to FIG. 2, the improved burnable absorber rod 30 basically includes an elongated hollow tubular member 34 having upper and lower opposite ends 36,38 and a hermetically sealed chamber 40 defined within the tubular member between its ends. A neutron absorber material 42 in liquid form is contained in the sealed chamber 40 of the tubular member 34. At the upper end 36 of the tubular member 34 is means 44 providing a hydrogen getter and being disposed in communication with the sealed chamber 40 for a purpose to be described later below. At the other, lower end 38 of the tubular member 34 is means 46 providing a hydride sink and also being disposed in communication with the sealed chamber 40 for a purpose also to be described hereafter.

The tubular member 34 is formed by a tubular body 48 and a pair of upper and lower end plugs 50,52, which are composed of any suitable material, but preferably a zirconium-based alloy such as Zircaloy-4. The plugs 50,52 are rigidly attached, such as by girth welds 54,56, to the opposite ends of the tubular body 48 so as to hermetically seal the same.

The liquid neutron absorber material 42 contained in the chamber 40 is preferably composed of boron dissolved in water (boric acid) with the boron enriched with B-10 over and above that proportion naturally present in boron. The use of enriched boron material in the improved rod 30 addresses and resolves one of the concerns with the use of boron: its solubility limit in water at room temperature. Its solubility limit is approximately 15,000 ppm at 100 degrees F. (at 325 degrees F. the limit is 125,000 ppm). To achieve its desired function, the rod 30 would require substantially more boron loading than 15,000 ppm. For the prior art fixed type absorber rod, the loading would be about 79,000 ppm; however, the improved absorber rod 30 would require only about 64,000 ppm of natural boron (or 12,800 ppm of B-10). But this is still higher than the low temperature solubility limit. Therefore, the boron would need to be enriched in B-10 as compared to natural boron which contains about 20% B-10 (the isotope of interest). A boron concentration using 85% enriched boron would be about 15,000 ppm natural boron (12,800 ppm B-10) which would stay in solution at the lower temperature.

In normal operation of the core, temperature gradients are formed along the length of the rod 30, with temperatures being cooler at the lower portion of the rod and hotter at the upper portion of the rod. The liquid absorber material 42 therefore spontaneously circulates within the sealed chamber 40 due to the presence of these gradients. Such circulation tends to self-equalize the rate of depletion of the neutron absorber material throughout the length of the chamber 40.

The tubular body 48 of the rod 30 has one or more reinforcing convolutions formed therein which enhance the structural rigidity and integrity of the rod so as to enable it to better withstand both high internal and external pressures acting on it. The reinforcing convolutions can take on the shape of a recess or groove 58 formed in the body 48 so as to extend along a spiraling path between the ends of the tubular member 34. Or, alternatively, the convolutions can be a series of ring-like circular grooves 60 formed in the body so as to extend circumferentially about and be spaced axially along the tubular member 34 between the ends thereof. Still further, some combination of both can be used. The use of spiral and/or circular convolutions 58,60 formed in the body 48 addresses and resolves another concern with the use of boron in the rod 30: how to handle the release of helium gas within the chamber 40 which results from the boron interaction with a neutron.

Parenthetically, it should be mentioned that the liquid boron solution does not fill the entire chamber 40 during non-operating periods, but only up to the level indicated by the numeral 62. This is so because the specific volume of the solution will change with temperature. In going from 100 degrees F. to 600 degrees F, water increases in volume by 45%. Since the rod 30 is designed to have absorber material at full core height during operation, the absorber column in the rod must be reduced during non-operating periods (refueling, etc.). Thus, there is a vapor space 64 present in the chamber 40.

Returning now to the concern with the release of helium gas and its solution by the use of convolutions, it should be noted that the helium released increases the end of life (EOL) pressure in the rod 30. The operating vapor pressure within the chamber 40 due to the water being at 600 degrees F, is about 1550 psi. Since the EOL internal pressure must be limited to approximately the reactor coolant pressure (2250 psi) to avoid outward creep of the tubular body (or cladding) 48, the final pressure of the released helium and backfill gas should be about 700 psi to equalize internal with external pressure. Thus, the beginning of life (BOL) backfill pressure must be reduced to around 300 psi. The reduced backfill pressure results in a fairly high pressure acting on the body 48 at BOL which can cause creep collapse of the rod 30. This dilemna is resolved by providing the above-mentioned convolutions, spiral groove 58 and/or circular grooves 60, which increase the collapse strength of the tubular body 48 due to BOL external pressure. If the circular grooves 60 are used, they would preferably be spaced about every one inch increment on the rod 30. Calculations show that a 0.039 inch deep convolution will double the collapse pressure of a 0.45 inch diameter x 0.024 inch wall tube. A 0.059 inch deep convolution will triple the collapse pressure. In summary, therefore, the convolutions 58 and 60 add sufficient strength to the thin wall of the tubular body 48 to withstand the external pressure at BOL.

To reduce corrosion of the inside of the tubular member 34, its material is beta quenched. This also reduces the hydride pickup in the member due to free hydrogen from the oxidation process. The solid lower end plug 52 also serves as the means 46 providing the hydride sink. Since this end of the member 34, being the lower one, is the cooler, the hydrogen will tend to migrate toward it. The upper end plug 50 is an attachment fitting for connecting the rod 30 to the spider 32, and adjacent to it is positioned the hydrogen getter means 44. The means 44 takes the form of a Zircaloy sponge 66 adapted to remove hydrogen from the vapor space 64 in the chamber 40 of the member 34. The sponge 66 is retained adjacent the upper end plug 50 by an annular disc 68 which has a central opening 70 for allowing passage of the hydrogen gas to the sponge 66. The disc 68 is held against the sponge 66 by a circumferential bulge 72 formed in the body 48 of the tubular member 34.

The lower end plug 52 of the tubular member 34 has a reduced diameter end portion 74 which adapts it to fit within a dashpot (not shown) at the bottom of the guide thimble 14. The dashpot functions as a shock absorber when the rods are inserted during a scram operation. The lower end plug 52 also has a fill passage 76 extending axially through it which is used to prepressurize the rod 30 with helium and then it is closed by weld 78.

It is thought that the improved soluble burnable absorber rod of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A soluble burnable absorber rod, comprising:
   (a) an elongated hollow tubular member having opposite ends and a hermetically sealed chamber defined therein between its said opposite ends, said tubular member including
      (i) a tubular body of thin wall construction and having reinforcing means defined therein, said reinforcing means taking the form of convolutions formed in said body, and
      (ii) a pair of end plugs attached to opposite ends of said body so as to hermetically seal the same;
   (b) a neutron absorber material in liquid form contained in said sealed chamber within said tubular member;
   (c) means providing a hydride sink disposed at one end of said tubular member and in communication with said sealed chamber, said sink being provided by one of said end plugs of said tubular member; and
   (d) means providing a hydrogen getter disposed at the other end of said tubular member and in communication with said sealed chamber, said means providing said getter being in the form of
      (i) a sponge of getter material disposed adjacent the other end plug of said tubular member, and
      (ii) a retainer disposed between said sponge and said chamber for positioning said sponge within said member and having a passageway formed therein for providing communication between said chamber and said sponge.

2. The burnable absorber rod as recited in claim 1, wherein: said liquid absorber material is boric acid enhanced with a B-10 isotope.

3. The burnable absorber rod as recited in claim 1, wherein said convolutions take the shape of a groove formed in said body so as to extend along a spiraling path between said ends of said tubular member.

4. The burnable absorber rod as recited in claim 1, wherein said convolutions take the shape of a series of circular grooves formed in said body so as to extend circumferentially about and be spaced axially along said tubular member between said ends thereof.

5. In a fuel assembly for a nuclear reactor including a plurality of guide thimbles and a plurality of nuclear fuel rods spaced apart from one another and from said guide thimbles and grouped together in an array organized to generate a neutron flux in said fuel assembly, an improved burnable absorber rod for insertion into at least one of said guide thimbles for regulating said reactor neutron flux, comprising:
   (a) an elongated hollow tubular member having opposite ends and a hermetically sealed chamber defined therein between its ends;
   (b) said tubular member being formed by a tubular body of thin wall construction and a pair of end plugs attached to opposite ends of said body so as to hermetically seal the same and define said chamber in said member;
   (c) a quantity of neutron absorber material in liquid form partially filling said chamber, said material being in the form of boric acid enhanced with a predetermined concentration of B-10 boron isotope;
   (d) reinforcing convolutions formed in said body of said tubular member and extending between said ends thereof for strengthening said member against external pressure acting on said body; and
   (e) means on said tubular member and in communication with said sealed chamber therein providing a getter for hydrogen and a sink for hydride generated by the absorption of neutrons by said boric acid in said chamber, said hydrogen getter means being in the form of
      (i) a getter sponge disposed adjacent one of said end plugs of said member,
      (ii) an annular disc retaining said sponge and having a passageway for communication of hydrogen from said chamber to said sponge, and
      (iii) a circumferential bulge formed in said body of said member for holding said disc against said sponge.

6. The burnable absorber rod as recited in claim 5, wherein said hydride sink is in the form of one of said end plugs of said member.

7. The burnable absorber rod as recited in claim 5, wherein said convolutions take the shape of a groove formed in said body so as to extend along a spiraling path between said ends of said tubular member.

8. The burnable absorber rod as recited in claim 5, wherein said convolutions take the shape of a series of circular grooves formed in said body so as to extend circumferentially about and be spaced axially along said tubular member between said ends thereof.

* * * * *